United States Patent
Han et al.

(10) Patent No.: US 9,130,857 B2
(45) Date of Patent: Sep. 8, 2015

(54) PROTOCOL INDEPENDENT MULTICAST WITH QUALITY OF SERVICE SUPPORT

(75) Inventors: Lin Han, San Jose, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 513 days.

(21) Appl. No.: 13/531,260

(22) Filed: Jun. 22, 2012

(65) Prior Publication Data

US 2012/0327775 A1 Dec. 27, 2012

Related U.S. Application Data

(60) Provisional application No. 61/499,992, filed on Jun. 22, 2011.

(51) Int. Cl.
*H04J 3/26* (2006.01)
*H04L 12/801* (2013.01)
*H04L 12/815* (2013.01)
*H04L 12/819* (2013.01)
*H04L 12/851* (2013.01)
*H04L 12/18* (2006.01)

(52) U.S. Cl.
CPC ............ *H04L 47/15* (2013.01); *H04L 12/1881* (2013.01); *H04L 47/21* (2013.01); *H04L 47/22* (2013.01); *H04L 47/2408* (2013.01); *H04L 47/2425* (2013.01)

(58) Field of Classification Search
USPC ............. 370/230, 231, 236, 312, 390, 395.2, 370/395.21, 432
See application file for complete search history.

(56) References Cited

U.S. PATENT DOCUMENTS

| | | | | |
|---|---|---|---|---|
| 6,252,857 | B1 * | 6/2001 | Fendick et al. | 370/254 |
| 8,018,964 | B2 * | 9/2011 | Eckert et al. | 370/432 |
| 8,144,628 | B2 * | 3/2012 | Previdi et al. | 370/256 |
| 2002/0089926 | A1 * | 7/2002 | Kloth | 370/220 |
| 2007/0147374 | A1 * | 6/2007 | Lee et al. | 370/390 |
| 2007/0280232 | A1 * | 12/2007 | Dec et al. | 370/390 |

(Continued)

FOREIGN PATENT DOCUMENTS

EP 1968251 A1 9/2008

OTHER PUBLICATIONS

Biswas et al. "A QoS-Aware Framework for PIM-SM Based IP-Multicast", Jun. 25, 1999.*

(Continued)

*Primary Examiner* — Kwang B Yao
*Assistant Examiner* — Nguyen Ngo
(74) *Attorney, Agent, or Firm* — Conley Rose, P.C.; Grant Rodolph; Brandt D. Howell

(57) ABSTRACT

An apparatus comprising a network node configured to communicate with a plurality of other network nodes via one or more logic links using protocol independent multicast (PIM), wherein the network node is further configured to transmit a PIM message comprising quality of service (QoS) data to at least one of the other network nodes. Also disclosed is a method comprising receiving, by a first network node, a first PIM join message comprising QoS data from a second network node, wherein the second network node is downstream from the first network node. Also disclosed is a method comprising: sending, by a first network node, a first PIM message comprising QoS data to a second network node, wherein the second network node is upstream from the first network node.

16 Claims, 9 Drawing Sheets

(56) References Cited

U.S. PATENT DOCUMENTS

| | | | |
|---|---|---|---|
| 2009/0028149 A1* | 1/2009 | Yasukawa et al. | 370/390 |
| 2010/0067527 A1* | 3/2010 | Watanabe | 370/390 |
| 2010/0303072 A1* | 12/2010 | Jokela et al. | 370/390 |
| 2011/0103225 A1* | 5/2011 | Martinotti et al. | 370/235 |
| 2011/0274107 A1* | 11/2011 | Lessard | 370/390 |
| 2011/0286450 A1* | 11/2011 | Wijnands | 370/390 |
| 2012/0027013 A1* | 2/2012 | Napierala | 370/390 |
| 2012/0170578 A1* | 7/2012 | Anumala et al. | 370/390 |
| 2012/0201244 A1* | 8/2012 | Ou et al. | 370/390 |

OTHER PUBLICATIONS

Adams, A., et al., "Protocol Independent Multicast-Dense Mode (PIM-DM): Protocol Specification (Revised)," RFC 3973, Jan. 2005, 61 pages.

Fenner, B., et al., "Protocol Independent Multicast-Sparse Mode (PIM-SM): Protocol Specification (Revised)," RFC 4601, Aug. 2006, 112 pages.

Bhattacharyya, S., Ed., "An Overview of Source-Specific Multicast (SSM)," RFC 3569, Jul. 2003, 15 pages.

Handley, M., et al., "Bidirectional Protocol Independent Multicast (BIDIR-PIM)," RFC 5015, Oct. 2007, 44 pages.

Boers, A., et al., "The Protocol Independent Multicast (PIM) Join Attribute Format," RFC 5384, Nov. 2008, 11 pages.

Vida, R., Ed., et al., "Multicast Listener Discovery Version 2 (MLDv2) for IPv6," RFC 3810, Jun. 2004, 63 pages.

Cain, B., et al., "Internet Group Management Protocol, Version 3," RFC 3376, Oct. 2002, 54 pages.

Foreign Communication From a Counterpart Application, PCT Application No. PCT/US2012/043865, International Search Report, mailed Oct. 8, 2012, 3 pages.

Foreign Communication From a Counterpart Application, PCT Application No. PCT/US2012/043865, Written Opinion mailed Oct. 8, 2012, 8 pages.

Bianchi, G., et al., "MulitGRIP: Quality of Service Aware Multicasting over DiffServ," Internet Engineering Task Force, Internet Draft, draft-bianchi-qos-multicast-over-diffserv-00.txt, Dec. 2002, 18 pages.

* cited by examiner

US 9,130,857 B2

PROTOCOL INDEPENDENT MULTICAST WITH QUALITY OF SERVICE SUPPORT

CROSS-REFERENCE TO RELATED APPLICATIONS

The present application claims priority to U.S. Provisional Patent Application No. 61/499,992 filed Jun. 22, 2011 by Lin Han and Renwei Li, and entitled "Method to Extend Protocol Independent Multicast for Quality of Service Support", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Protocol Independent Multicast (PIM) is a family of network routing protocols that provide one-to-many and many-to-many distribution of data over Internet Protocol (IP) networks. PIM is considered protocol independent because PIM does not include a topology discovery mechanism. PIM may obtain routing information from other protocols such as Routing Information Protocol (RIP), Open Shortest Path First (OSPF), Border Gateway Protocol (BGP), and Multicast Source Discovery Protocol (MSDP). PIM may allow data to be transmitted and received across channels defined by (S, G) and/or (*, G) where S denotes the IP address of a transmission source, G denotes the IP addresses of a group of receivers, and * denotes the IP addresses for all transmission sources for the group of receivers. PIM does not currently offer quality of service (QoS) for multicast streams.

SUMMARY

In one embodiment, the disclosure includes an apparatus comprising a network node configured to communicate with a plurality of other network nodes via one or more logic links using PIM, wherein the network node is further configured to transmit a PIM message comprising QoS data to at least one of the other network nodes.

In another embodiment, the disclosure includes a method comprising receiving, by a first network node, a first PIM join message comprising QoS data from a second network node, wherein the second network node is downstream from the first network node.

In yet another embodiment, the disclosure includes a method comprising sending, by a first network node, a first PIM message comprising QoS data to a second network node, wherein the second network node is upstream from the first network node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PIM network may comprise a plurality of interconnected network elements (NEs). A NE may that is connected to a source or a PIM rendezvous point (RP) may be referred to as a first hop router (FHR), a NE that is connected to a client device may be referred to as a last hop router (LHR), and a NE along a path between a FHR and an LHR may be referred to as an intermediate node/router. A source may transmit communications downstream to a client device via the PIM network and a client device may send requests upstream toward a source via the PIM network.

Disclosed herein is an apparatus, system, and method of performing Quality of Service (QoS) reservation using PIM. A LHR may receive QoS data from a client using Internet Group Management Protocol (IGMP) and/or Multicast Listener Discovery (MLD). A LHR may send a join message containing the QoS data toward a FHR through any intervening intermediate nodes. Each network element, including the LHR and FHR, may use the QoS data to make QoS reservations for subsequent communications between the source/RP and the client device. If a network element is unable to make a QoS reservation, e.g. due to limited local resources, the network element may send a PIM QoS fail message to a network management device and may discard or continue forwarding the PIM QoS join message. The network element may also send a PIM QoS fail to the joining LHR or all downstream LHRs. A network element may also transmit a PIM QoS hello message to adjacent network elements to determine if the adjacent network elements support PIM QoS. If a network element determines to transmit a join message to another network element that does not support PIM QoS, the forwarding network element may send a PIM QoS fail and may forward the PIM QoS join message.

Figure 1:
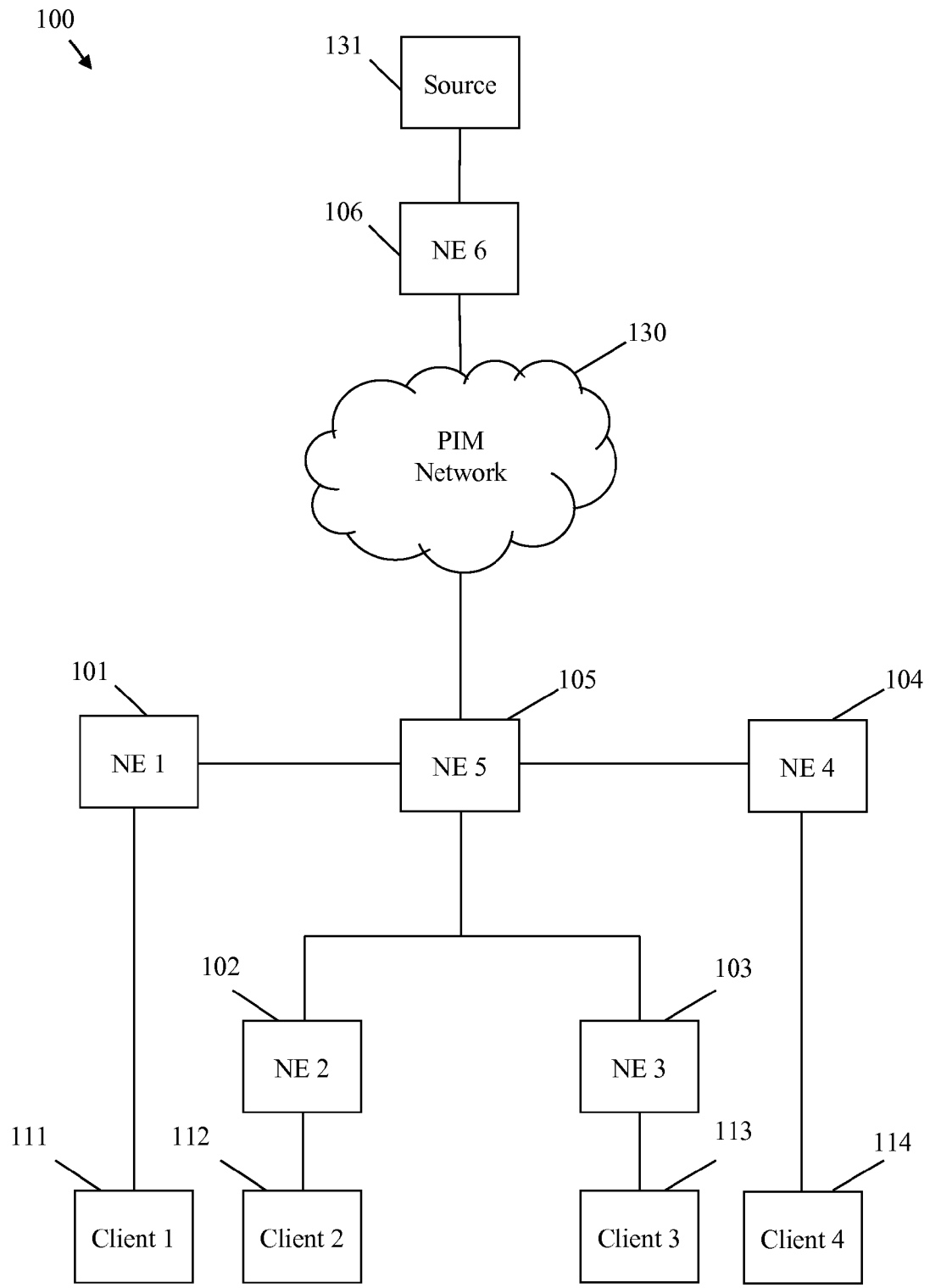
FIG. 1 is a schematic diagram of an embodiment of a network with NEs capable of employing PIM.

FIG. 1 is a schematic diagram of an embodiment of a network 100 with NEs capable of employing PIM. The network 100 comprises a source device 131 capable of sending data to and receiving data from client devices 111, 112, 113, and 114. The source device 131 may be connected to the client devices 111-114 through a plurality of NEs 101-106 and a PIM network 130. Specifically, the source device 131 may be connected to NE 106, which may be connected to the PIM network 130. NE 105 may connect NEs 101-104 to the PIM network 130. Client devices 111-114 may be connected to NEs 101-104, respectively. It should be understood that NEs 101-106 may be part of PIM network 130 and are shown for purposes of clarity. Each connection and/or interface between two NEs may be a PIM enabled connection/interface. Each connection and/or interface between a NE and a client device may be an IGMP/MLD enabled connection/interface. The connection/interfaces between source device 131 and NE 106 may be enabled for IGMP, MLD, PIM, or any other suitable transmission protocol.

The source device 131 may be a machine capable of transmitting data to and receiving data from client devices over an IP network, such as an internet content provider. Each NE may be a multicast router, or similar device, configured to receive, transmit, and/or process information using PIM channels denoted (S, G) and/or (*, G) where S denotes the IP address of a single source device, such as source device 131, G denotes the IP addresses of all NEs/client devices in a group that have requested data from the source, and * denotes the IP addresses of all source devices transmitting to G including any source device 131 and any source devices that may be located in the PIM network 130. Specifically, a NE may receive a communication from a source, sources, or an upstream NE, replicate the communication as needed, and transmit the communication to downstream NEs or client devices that wish to receive the communication. Each client device 111-114 may be capable of requesting and receiving data from the source device 131. Each client device 111-114 may be a single computer and/or server, a plurality of computers/servers connected by one or more switches and/or routers, mobile device, or any other device or devices commonly employed in host networks, local area networks (LANs), wide area networks (WANs), or similar networks. The Client devices 111-114 may enter and/or leave channel (S, G) and/or (*, G) based on whether a particular client device needs access to the data being transmitted from the source device 131 as discussed below.

Requested data may be transmitted from the source device 131 to one or more of the client devices 111-114 via NEs 101-106 and the PIM network 130. A plurality of data transmissions from a source device to a given client device may be referred to as a data stream. Data traveling from a source device to a client device may be referred to as moving in a downstream direction or downstream, while data traveling from a client device to the source device may be referred to as moving in a upstream direction or upstream. For example, data moving from source device 131 to any client device 111-114 travels downstream and data moving from any client device 111-114 to source device 131 travels upstream. NE 106 may be referred to as the FHR as NE 106 is the first router a message encounters when transmitted from the source device 131. NEs 101-104 may be referred to as LHRs as each of these NEs may be the last routers messages encounter when transmitted from the source device 131 to the client devices 111-114, respectively. The PIM network 130 may comprise any number of NEs connected in any topology. NEs 101-106 and PIM network 130 together constitute a PIM network. NEs 101-106 are shown for illustrative purposes.

As discussed above, a source 131 or sources may transmit data to one or more of the client devices 111-114. Such transmission may be accomplished by employing various routing methods, schemes, or protocols between the source 131, the FHR 106, the LHRs 101-104, and the client devices 111-114. The client devices 111-114 may communicate with the LHRs 101-104 via IGMP versions one through three and Multicast Listener Discovery (MLD) versions one and two. Transmissions between the FHR 106 and the LHRs 101-104 may be accomplished by a multicast scheme such as PIM. Multiple variants of PIM may be employed including PIM Dense Mode (PIM-DM), PIM Sparse Mode (PIM-SM), PIM Source Specific Mode (PIM-SSM), and PIM Bidirectional Mode (PIM-BIDIR), as set forth in internet engineering task force (IETF) documents request for comments (RFC) 3973, RFC 4601, RFC 3569, and RFC 5015, respectively, which are hereby incorporated by reference.

PIM-DM may presume that all downstream nodes wish to receive content transmitted by a source 131. In PIM-DM, all data transmitted from the source 131 may initially be flooded to the entire network 100. A NE may receive a prune message from the NE's upstream neighbors and may send the prune message to the NE's downstream neighbors. If no response is received to indicate that a downstream neighbor node wishes to be a member of channel (*, G) and/or (S, G), the NE and the NE's downstream neighbors to be removed from the channel. One or more of the NE's downstream neighbors may respond with a join message, which may be forwarded to the NE's upstream neighbors to prevent the NE and the NE's downstream neighbor from being removed from the channel. If a NE has been previously removed from the channel and a downstream neighbor wishes to enter the channel, the downstream neighbor may send a graft message to the NE, which may be forwarded to the NE's upstream neighbors and may cause the NE and the NE's downstream neighbors to enter the channel. A pruned state, e.g. no membership in the channel, may timeout causing the NE and the NE's downstream neighbors to reenter the channel. Prune messages may be sent periodically to allow the NE to remain out of the channel. Such prune messages may trigger more join messages.

In PIM-SM, a LHR may send a PIM join message toward a NE designated as an RP for the channel (S, G) and/or (*, G), via any intervening NEs. A NE may be statically or dynamically designated as an RP, depending on the embodiment. All NEs must join through the RP, the RP receives data from the source, and transmits the data downstream on behalf of the source. When a join message is sent from a LHR toward the RP, the join message may reach the RP or a NE that is already a member of the channel, at which point the LHR and any intervening NEs may become members of the channel. PIM messages from the source, through the RP, may travel back to the LHR through reverse path routing. This process may create an RP multicast tree, which may be rooted at the RP. Once the RP tree reaches a predetermined size, the RP tree may be converted to a Source Path Tree (SPT), which may allow packets to be routed directly from the source's FHR to the LHR. Join messages may be periodically refreshed by the members of the channel, and membership in the channel may timeout if no join message is sent from a given NE. PIM-BIDIR may function in a substantially similar manner to PIM-SM. However, PIM-BIDR may create a bidirectional tree between the source and the LHRs, which may pass though the RP. The bidirectional tree may not be converted to a SPT.

In PIM-SSM, a channel may be limited to a single source (S, G). A LHR wishing to join the channel may send a join message upstream to the FHR. Each NE receiving a join message my become part of channel (S, G). Join messages may be periodically refreshed by the members of the channel, and membership in the channel may timeout if no join message is received by an upstream NE.

Regardless of the version of PIM employed, a NE 101-104 may join or remain in a PIM channel by transmitting join messages upstream to a FHR connected to a source device 131 or a FHR functioning as an RP. The FHR may be NE 106 or may be a node in PIM 130 if the source or sources are located in PIM 130. For example, source device 131 may comprise two sources S1 and S2. Alternatively, source device 131 may comprise S1 and S2 may be located in the PIM network 130. Client devices 111 and 112 may wish to receive data from S1, while 113 and 114 may wish to receive data from S2. The client devices 111-114 may each request to join their respective channels by contacting the NEs 101-104 to which each client device is attached using IGMP, MLD, or a similar protocol. NE 101 and 102 may each send a join (S1, G1) message to NE 105. NE 103 and 104 may each send a join (S2, G2) message to NE 105. NE 105 may send a join (S1, G1) message and a join (S2, G2) message toward the FHR, e.g NE 106, through the PIM network 130 and/or to a FHR in the PIM network 130. NEs 101, 102, 105, and 106 may then become or remain members of (S1, G1) and NEs 103, 104, 105, and 106 may become or remain members of (S2, G2), where S1 is the IP address of source 1, S2 is the IP address of source 2, G1 is the group of network elements receiving data from S1, and G2 is the group of network elements receiving data from S2.

Each NE 101-106 may comprise a multicast forwarding information base (MFIB), which may store the NEs PIM group status by making data entries related to all incoming and outgoing PIM join messages. Each NEs MFIB may also indicate whether the NE should receive data packets from an upstream node and replicate the data packets to be sent to multiple downstream nodes or forward the received data packets without replication.

Figure 2:
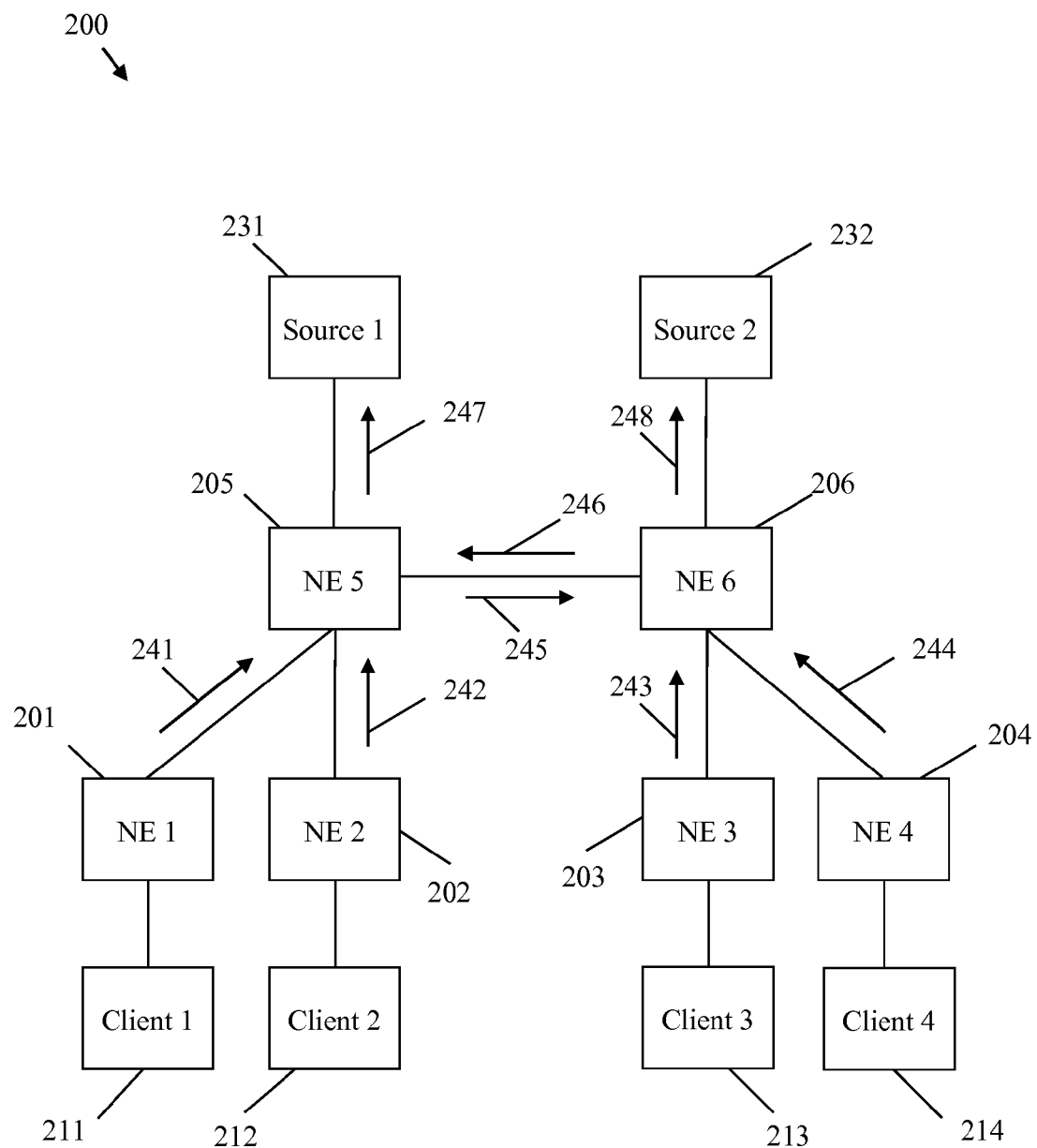
FIG. 2 is a schematic diagram of an embodiment of a network with NEs capable of employing PIM to transmit QoS data.

FIG. 2 is a schematic diagram of an embodiment of a network 200 with NEs capable of employing PIM to transmit QoS data. The network 200 may comprise substantially the same components of network 100, but in a different configuration and with one additional source device. As shown in FIG. 2, clients 211-214 may be connected to NEs 201-204, respectively; NEs 201 and 202 may be connected to NE 205; NEs 203 and 204 may be connected to NE 206; NE 205 may be connected to NE 206 and a first source device 231; and NE 206 may also be connected to a second source device 232. NEs 201-204 may be considered LHRs and NEs 205 and 206 may be considered FHRs. The characteristics of network 200 described here apply to a network with any number of source devices, NEs, and client devices.

Network 200 may provide for QoS provisioning. When a NE receives a downstream data packet transmitted over a channel, the NE may receive the packet over an incoming interface, process the packet according to the MFIB including performing any packet replication, and transmit the packet and/or replicated packets over an outgoing interface. The packet(s) may be placed in various buffers and queued for processing and for transmission. If the NE receives more packets than the NE is capable of processing and transmitting, the NEs buffers may run out of space, which may prevent new packets from being stored and may lead to packets being dropped. QoS provisioning may allow a NE to allocate buffer space or other resources for a particular channel. QoS provisioning may also allow a NE to guarantee a particular channel greater queue priority or bandwidth. QoS data may be any data used by the network 200 to perform QoS provisioning and may include, without limitation: maximum bandwidth, minimum bandwidth, maximum packet size, maximum latency, and user defined parameters such as scheduling priority and egress queue depth for downstream packet forwarding and/or replication. A NE 201-206 may consider any QoS data received in performing QoS provisioning. In an embodiment, the NEs 201-206 may consider accumulated latency over multiple hops and/or perform multicast traffic shaping using a leaky bucket algorithm in conjunction with maximum and minimum bandwidth requests.

Clients 211 and 213 may wish to receive data from channel (S1, G1) and clients 212 and 214 may wish to receive data from channel (S2, G2), where S1 is source device 131 and S2 is source device 132. Clients 211-214 may each wish to request QoS provisioning for the data transmitted to them across an associated channel. Each client 211-214 may send QoS data to the NE 201-204, respectively, using IGMP and/or MLD. The LHRs 201-204 may accept the QoS data from clients 211-214, process the QoS data, and transmit the QoS data upstream as part of PIM join messages 241-244. Processing the QoS data may involve determining if local QoS provisioning is possible given current local resources and performing local QoS provisioning. PIM join messages 241 and 243 may indicate that clients attached to NEs 201 and 203 wish to join channel (S1, G1) and include the QoS requirements of clients 211 and 213, respectively. Likewise, PIM join messages 242 and 244 may indicate that clients attached to NEs 202 and 204 wish to join channel (S2, G2) and include the QoS requirements of clients 212 and 214, respectively.

NE 205 may receive join messages 241 and 242, and NE 206 may receive join messages 243 and 244. As NE 205 and NE 206 may both be attached to downstream clients that wish to join both channels (S1, G1) and (S2, G2), NEs 205 and 206 may both send requests to join both channels. NE 205 may send join message 245 to NE 206 as NE 206 is upstream from NE 205 with respect to source device 232 for channel (S2, G2). Likewise, NE 206 may send join message 246 to NE 205 as NE 205 is upstream from NE 206 with respect to source device 231 for channel (S1, G1). Join message 246 may carry QoS data from NE 203, and join message 245 may carry QoS data from NE 202. At this point, NE 205 may have received join message 246 from NE 203/206 and join message 241 from NE 201. In order to perform QoS provisioning, NE 205 may select the QoS with the most stringent requirements to ensure that QoS provisioning is sufficient for all requesting nodes. For example, if join message 241 contains the most stringent QoS requirements, NE 205 may provision based on the QoS information received in 241 and send a join message 247 to source device 231 with QoS information based on the QoS information received in 241. Likewise, NE 206 may have received join messages 244 and 245 from NEs 202/205 and 204, respectively. If join message 245 comprises the most stringent QoS requirements, NE 206 may send a join message 248 to source device 232 with QoS information based on the QoS information received in 245. This process may result in multicast trees for (S1, G1) and (S2, G2), wherein G1 equals NE 201, 203, and 205-206, wherein G2 equals 202 and 204-206, S1 equals source device 131, and S2 equals source device 132. This process may also result in QoS provisioning for all client devices 211-214. The provisioned QoS resources may later be released if the client device(s) requiring QoS wish to leave a channel.

PIM QoS provisioning may be implemented in each version of PIM (e.g PIM-SM, PIM-DM, PIM-SSM, and PIM-BIDIR). As PIM-SSM may comprise a single source QoS provisioning may be implemented by placing the QoS data in the PIM join message during multicast tree creation and sending the PIM join message across the multicast tree toward the source address. PIM-SM may have two general embodiments as PIM-SM creates an RP tree and a SPT, which may comprise different root locations. In the first embodiment, the RP may be considered the source address as long as the RP tree is in use. Once RP tree is converted to a SPT, the source may be considered the source address, which may require that the QoS information be refreshed for the SPT. In the second embodiment, the network may only perform QoS provisioning once the source tree is created. PIM-BIDIR may require the PIM join message be forwarded past the RP to the FHR connected to the source. PIM-DM may require that the join message with QoS data be forwarded to the FHR in response to a prune message. Also, in PIM-SM, PIM-BIDIR, and PIM-DM, QoS provisioning to multiple FHRs may be required in cases where more than one source is in use, e.g. the scenario denoted by (*, G).

Figure 3:
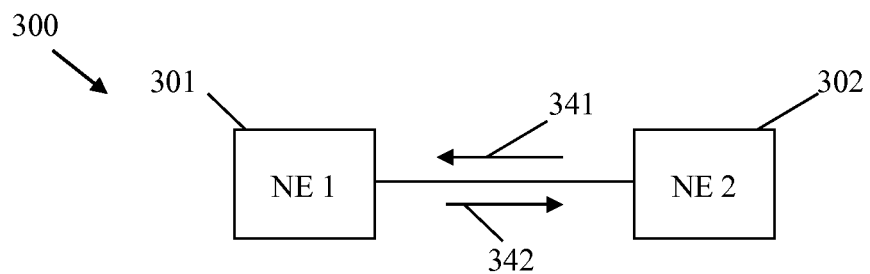
FIG. 3 is a schematic diagram of an embodiment of a network with NEs capable of transmitting PIM hello messages.

FIG. 3 is a schematic diagram of an embodiment of a network 300 with NEs capable of transmitting PIM hello messages. Network 300 comprises connected NEs 301 and 302, which are substantially similar to the NEs in networks 100 and 200 and may be included as part of networks 100 and/or 200. PIM with QoS support may be deployed in a network that comprises legacy equipment that does not support PIM QoS. To account for this possibility, a NE may determine if the NE's neighbor nodes are PIM QoS capable and account for the neighbor nodes capabilities when performing QoS provisioning. NE 301 may send a PIM hello message 342 to NE 302. PIM hello message 342 may comprise a PIM QoS option to indicate that NE 301 is PIM QoS capable. If NE 302 is QoS capable, NE 302 may receive hello 342, may store data indicating that NE 301 is QoS capable, and may send a responsive PIM hello message 341 to NE 301 indicating that NE 302 is also QoS capable. If NE 302 is not QoS capable, NE 302 may discard the hello 342 or may send a responsive PIM hello in a legacy format (e.g. without the PIM QoS option). NE 301 may determine the PIM QoS capabilities of NE 302 based on the response or lack of response and store data indicating the PIM QoS capabilities of NE 302. If a NE receives an unsolicited PIM hello message in a legacy format, the NE may assume the sender is not QoS capable or may send a responsive PIM QoS hello message to verify the neighbors PIM QoS capabilities.

Figure 4:
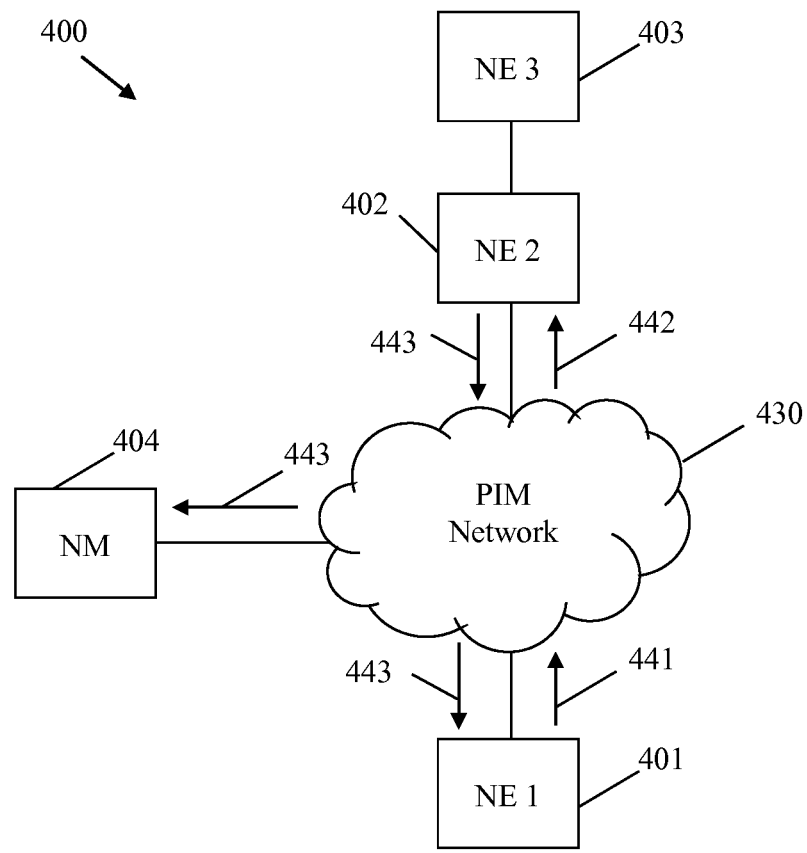
FIG. 4 is a schematic diagram of an embodiment of a network with NEs capable of transmitting PIM QoS fail messages.

FIG. 4 is a schematic diagram of an embodiment of a network 400 with NEs capable of transmitting PIM QoS fail messages. Network 400 may comprise substantially the same components as networks 100, 200, and/or 300 in a different configuration and may also comprise a network management device 404. NE 401 may be connected to NE 403 via PIM network 430 and NE 402. NEs 401-403 may also be connected to the network management device 404 via the PIM network 430. The network management device 404 may be any network node or connected device tasked with managing overall network traffic or reporting network traffic status to network administrators.

A QoS reservation may fail at a node because of insufficient resources to meet QoS provisioning requirements or because an upstream node is not QoS capable. Network 400 may comprise components capable of handling QoS reservation failures. NE 401 may transmit a join message 441 with QoS data to NE 402 through the PIM network 430. Join 441 may pass though one or more NEs in the PIM network 430 and may exit the PIM network 430 as join 442, which may include more stringent QoS data from another NE wishing to join the channel. NE 402 may fail to provision QoS resources due to insufficient resources or because NE 402 is aware that upstream NE 403 is not PIM QoS capable. NE 402 may send a PIM QoS fail message 443 back to NE 401 indicating the failure and the reason for the failure. Alternatively, NE 402 may send a PIM QoS fail message 443 to all downstream LHRs, or all downstream LHRs on a given channel. Additionally or alternatively, the NE 402 may send a PIM QoS fail message 443 to the network management device 404. If the QoS failure was caused by an upstream router without PIM QoS capability, NE 403 may send a PIM join message to NE 403 with or without the QoS data. If the QoS failure was caused by insufficient local resources, depending on the embodiment of network 400, NE 402 may discard the PIM join message 442 or send a PIM join message to NE 403 indicating a QoS failure. Upon receiving a QoS fail message, a NE 401-403 may release any QoS resources that were related to the unsuccessful QoS request.

Figure 5:
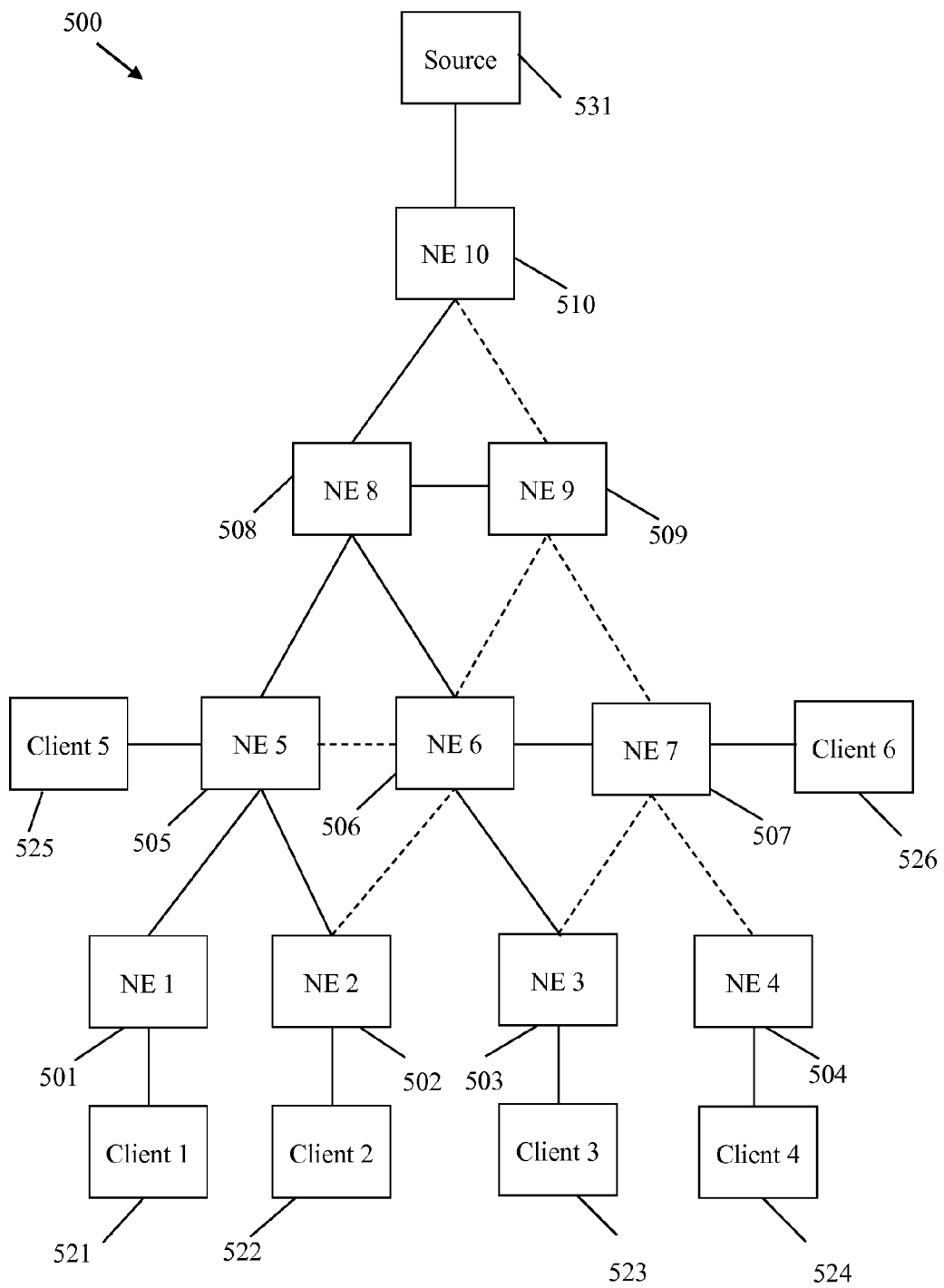
FIG. 5 is a schematic diagram of an embodiment of a network with NEs capable of transmitting PIM QoS fail messages for multiple channels.

FIG. 5 is a schematic diagram of an embodiment of a network 500 with NEs capable of transmitting PIM QoS fail messages for multiple channels. Network 500 may comprise substantially the same components as networks 100 and/or 200 in a different configuration. The network 500 may comprise source device 531, NEs 501-510, and client devices 521-526 connected as shown in FIG. 5. Network 500 may comprise channels (S1, G1) and (S2, G2) wherein source device 531 acts as both S1 and S2. The dotted lines between NEs may indicate the multicast tree for (S2, G2) and the solid lines between NEs may indicate the multicast tree for (S1, G1). NE 510 may be the FHR for both channels. NEs 501-503 and 507 may be LHRs for channel (S1, G1), and NEs 502-505 may be LHRs for channel (S2, G2).

In the event of a link failure, a NE downstream from the failed link may send a PIM QoS fail message to all the NEs downstream LHRs that were using or were attempting use to the failed link as part of a multicast tree. For example if the link between NE 507 and NE 509 were to fail, NE 507 may send a PIM QoS fail message to all of NE's 507 downstream nodes on channel (S2, G2), which may include NE 503 and NE 504. In the event of a QoS failure on channel (S1, G1) at NE 508, NE 508 may send a PIM QoS fail message to all downstream LHRs on channel (S1, G1), which may include NE 501-503 and 507. In the event of a QoS failure on channel (S1, G1) at NE 506, NE 506 may send a PIM QoS fail message to all downstream LHRs on channel (S1, G1), which may include NE 503. In the event of a QoS failure on channel (S2, G2) at NE 506, NE 506 may send a PIM QoS fail message to all downstream LHRs on channel (S2, G2), which may include NE 502 and 505.

Figure 6:
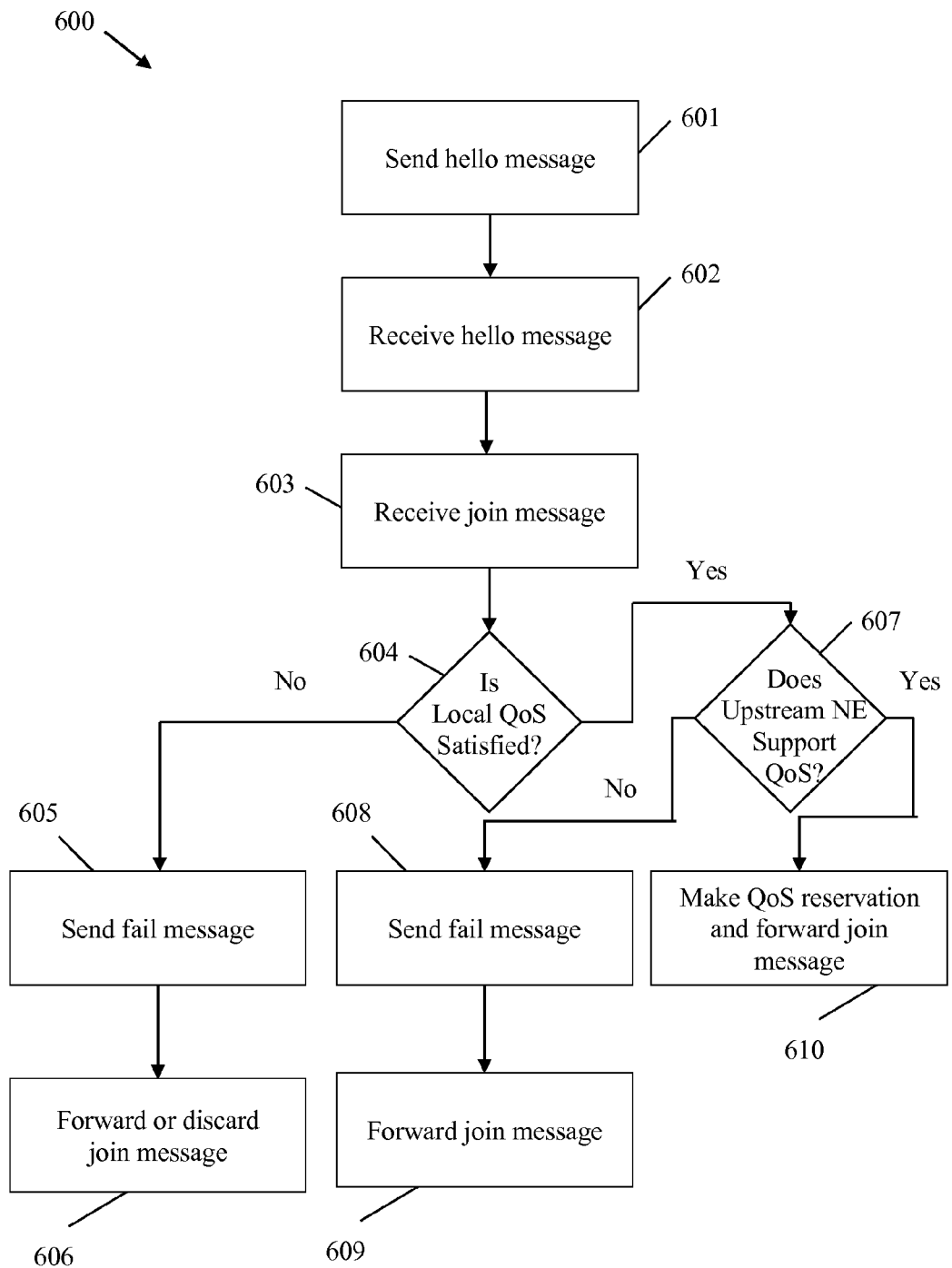
FIG. 6 is a flowchart of an embodiment a PIM QoS reservation method.

FIG. 6 is a flowchart of an embodiment a PIM QoS reservation method 600, which may be used in conjunction with networks employing PIM with QoS, such as networks 100-500. In step 601, a NE may determine the PIM QoS capabilities of the NE's neighbors by sending a hello message with a PIM QoS option to each neighbor. In step 602, the NE may receive a responsive hello message. Based on the responsive messages, the NE may determine the PIM QoS capabilities of the NE's neighbors and store data indicating those capabilities for future use. In step 603, the NE may then receive a PIM QoS join message from one or more downstream neighbors. In decision block 604, the NE may process the QoS information to determine if local QoS provisioning is possible, and may proceed to step 605 if local QoS provisioning is not possible or decision block 607 if local QoS provisioning is possible. If local QoS provisioning is not possible, in step 605 the NE may send fail messages as discussed above. In step 606, the NE may then forward the PIM join message to an upstream node or discard the PIM join message, depending on the embodiment. If local QoS provisioning is possible, in decision block 607 the NE may determine if the upstream node is PIM QoS capable based on data collected at step 602. If the upstream node is PIM QoS capable, in step 610 the NE may perform QoS provisioning by reserving sufficient resources based on the QoS data from the PIM join message and forward the PIM join message to the upstream node. If the upstream node is not PIM QoS capable, in step 608 the NE may send PIM QoS fail messages as discussed above. In step 609, the NE may then forward 609 the join message to the upstream NE.

Figure 7:
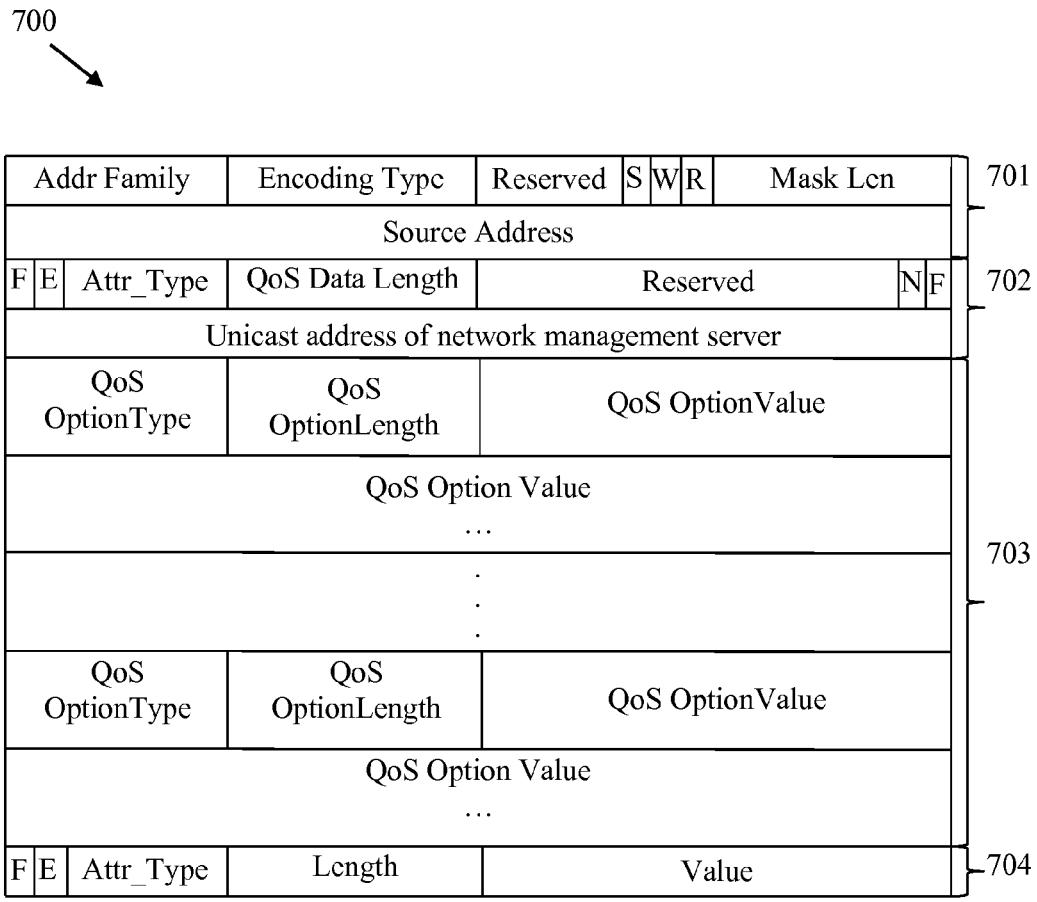
FIG. 7 illustrates an embodiment of an encoding for a PIM QoS join message.

FIG. 7 illustrates an embodiment of an encoding for a PIM QoS join message 700. The join message 700 may comprise a plurality of fields in successive thirty two bit sections, each section being numbered from bit position zero to bit position thirty one. The join message 700 may comprise a PIM join header 701, which may be encoded substantially as set forth in IETF documents RFC 5384 and RFC 4601, which are hereby incorporated by reference, and may indicate that the message 700 is a PIM join message.

The join message 700 may comprise a QoS attribute 702, which may indicate that the join message carries PIM QoS data. The QoS attribute 702 may comprise an F bit and an E bit in bit positions zero and one as disclosed in RFC 5384. The QoS attribute 702 may comprise an Attr_Type field which may be six bits long, may extend from bit position two to bit position seven, and may comprise data indicating the attribute 702 is a QoS attribute. The Attr_Type filed may be set to a value of two. The QoS attribute 702 may comprise a QoS data length field which may be eight bits long, may extend from bit position eight to bit position sixteen, and may comprise data indicating the length of the QoS attribute 702 and related QoS data 703. The QoS attribute 702 may comprise a reserved field which may be fourteen bits long, may extend from bit position sixteen to bit position twenty nine. The QoS attribute 702 may comprise an N flag and an F flag, which may be located at bit positions thirty and thirty one, respectively. The N flag may be set to indicate a PIM QoS failure message should be sent in case of a PIM QoS failure. The F flag may be cleared to indicate that the join message 700 may not be forwarded to an upstream node if QoS provisioning has failed locally. The QoS attribute 702 may comprise a Unicast Address of Network Management Server field which may be thirty two bits long, may extend from bit position zero to bit position thirty one, and may comprise data indicating the address of the entity that may be notified in the event of a PIM QoS failure (e.g. a network management server or a LHR).

The join message 700 may further comprise QoS data 703, which may indicate the QoS constraints the entity transmitting the join message 700 has requested. The QoS data 703 may comprise one or more QoS parameters. Each QoS parameter may comprise a QoS Option Type field, a QoS Option Length field, and a QoS Option Value field. The QoS Option Type field may be eight bits long, may extend from bit position zero to bit position seven, and may comprise data indicating the type of QoS option that the parameter comprises. The QoS Option Type field may indicate one of a plurality of QoS options, including minimum bandwidth, maximum bandwidth, maximum packet size, maximum latency, and user defined. For example, the QoS Option Type field may be set to one to indicate a minimum bandwidth parameter, two to indicate a maximum bandwidth parameter, three to indicate a maximum packet size parameter, four to indicate a maximum latency parameter, and five to indicate a user defined parameter such as queue type or scheduling priority. The QoS Option Length field may be eight bits long, may extend from bit position eight to bit position fifteen, and may comprise data indicating the length of the QoS parameter. The QoS Option value field may be of variable length, may extend from bit position sixteen to bit position thirty one and may extend to additional thirty two bit segments as needed. The QoS Option value field may comprise data indicating value of the QoS parameter. The join message 700 may further comprise additional PIM attributes 704 as set forth in IETF RFC 5384.

Figure 8:
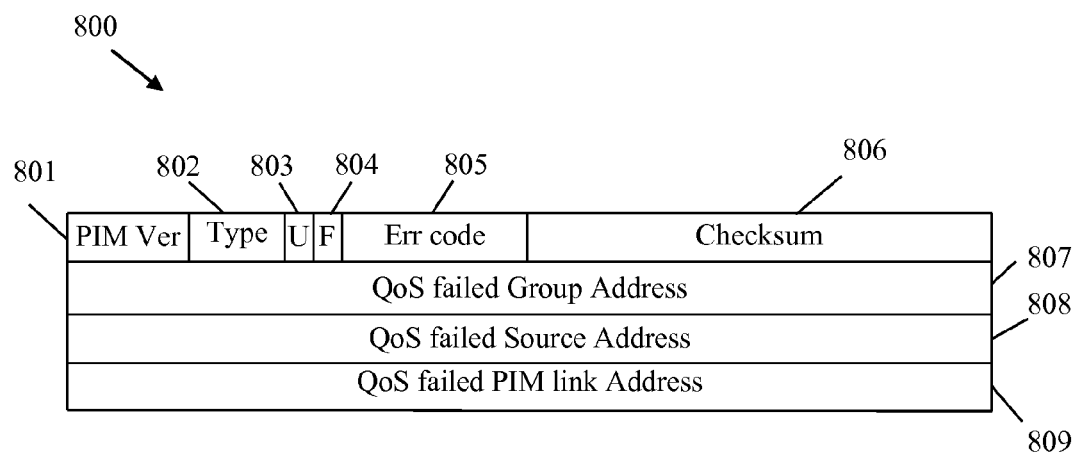
FIG. 8 illustrates an embodiment of an encoding for a PIM QoS fail message.

FIG. 8 illustrates an embodiment of an encoding for a PIM QoS fail message 800. The fail message 800 may comprise a plurality of fields in successive thirty two bit sections, each section being numbered from bit position zero to bit position thirty one. The fail message 800 may comprise a PIM Version field 801 which may be four bits long, may extend from bit position zero to bit position three, and may indicate the version of PIM used by the network. The PIM Version field 801 may be set to a value of two. The fail message 800 may comprise a Type field 802 which may be four bits long, may extend from bit position four to bit position seven, and may indicate that the message 800 is a fail message. The Type field 802 may be set to a value of nine. The fail message 800 may comprise a U bit 803 and an F bit 804 at positions eight and nine, respectively. The U 803 bit may be set to indicate that the failure occurred on the uplink and cleared to indicate failure occurred on the downlink. The F 804 bit may be set to indicate that the message 800 is sent in response to a failure and cleared to indicate that the message 800 is being sent in response to a previous failure that has now been corrected. The fail message 800 may comprise an Error Code field 805 which may be six bits long, may extend from bit position ten to bit position fifteen, and may indicate type of QoS failure that has occurred. The Error Code field 805 may be set to a value of one to indicate a minimum bandwidth reservation failure, two to indicate a maximum bandwidth reservation failure, three to indicate a maximum packet size reservation cannot be satisfied, four to indicate requested latency cannot be satisfied, and five to indicate a user defined QoS parameter failure. The fail message 800 may comprise a Checksum field 806 which may be sixteen bits long, may extend from bit position fifteen to bit position thirty one, and may be used for transmission error checking. The fail message 800 may comprise a QoS Failed Group Address field 807 which may be thirty two bits long and may extend from bit position zero to bit position thirty one. The fail message 800 may comprise a QoS Failed Source Address field 808 which may be thirty two bits long and may extend from bit position zero to bit position thirty one. The QoS Failed Group Address field 807 and the QoS Failed Source Address field 808 may be used to indicate the PIM channel and/or (*, G) associated with the failure. The group number of the PIM channel may be encoded in the QoS Failed Group Address field 807, and the source of the PIM channel may be encoded in the QoS Failed Source Address field 808. The fail message 800 may further comprise a QoS Failed PIM Link Address field 809 which may be thirty two bits long, may extend from bit position zero to bit position thirty one, and may indicate the link address of the QoS failure. If the failure occurred because of insufficient local resources, the Failed PIM Link Address field 809 may indicate address of the nodes downstream link. If the failure occurred because an upstream node is not PIM QoS capable, the Failed PIM Link Address field 809 may indicate the address of the nodes upstream link.

Figure 9:
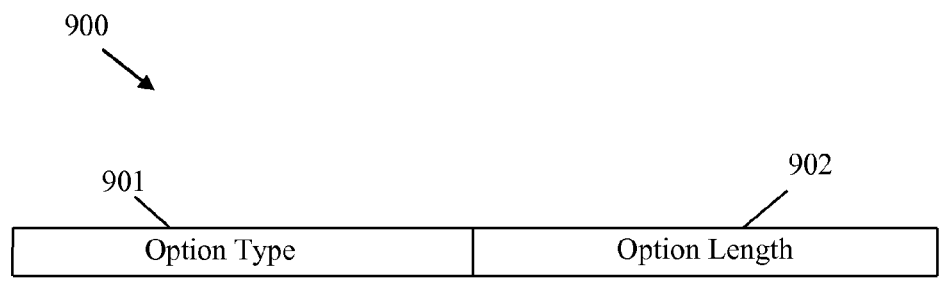
FIG. 9 illustrates an embodiment of an encoding for a PIM QoS hello message.

FIG. 9 illustrates an embodiment of an encoding for a PIM QoS hello message option 900. The hello message option 900 may comprise an Option Type field 901 which may be sixteen bits long and may extend from bit position zero to bit position fifteen, and may indicate that the message 900 is a PIM QoS hello message. The Option Type field 901 may set to a value of thirty two. The hello message option 900 may comprise an Option Length field 902 which may be sixteen bits long and may extend from bit position sixteen to bit position thirty one, and may indicate length of the PIM QoS hello message option 900. The Option Length field 902 may set to a value of zero.

Figure 10:
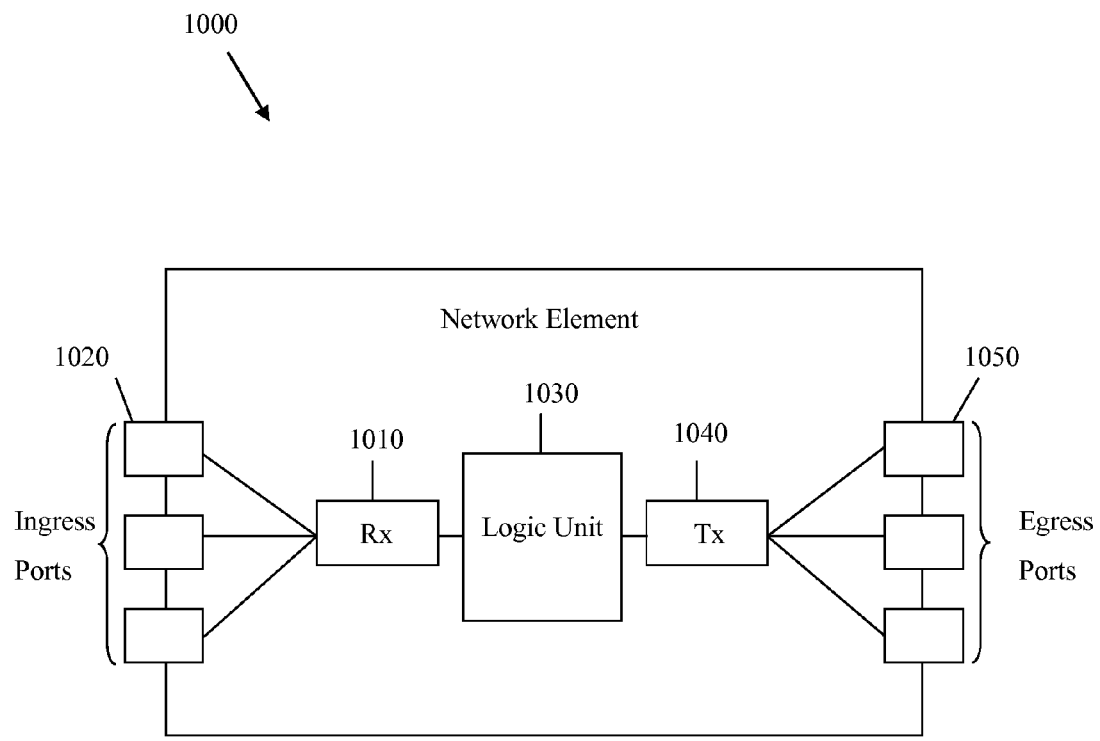
FIG. 10 is a schematic diagram of an embodiment of a network element.

FIG. 10 illustrates an embodiment of a network element 1000, which may comprise a processor or a transceiver as described above, e.g., within a network or system. The network element 1000 may comprise a plurality of ingress ports 1020 and/or receiver units 1010 for receiving data, logic unit or processor 1030 to process signals and determine where to send the data to, and a plurality of egress ports 1050 and/or transmitter units 1040 for transmitting data to other systems. The logic unit 1030 may comprise a plurality of ingress buffers and a plurality of egress buffers for storing received communications prior to processing and prior to transmission to other systems. The logic unit or processor 1030 may be configured to implement any of the schemes described herein, such as the PIM QoS reservation method 600, and may be implemented using hardware, software, or both. For example, the network element 1000 may be any NE in a network that implements PIM with QoS as described herein such as illustrative networks 100-500.

Figure 11:
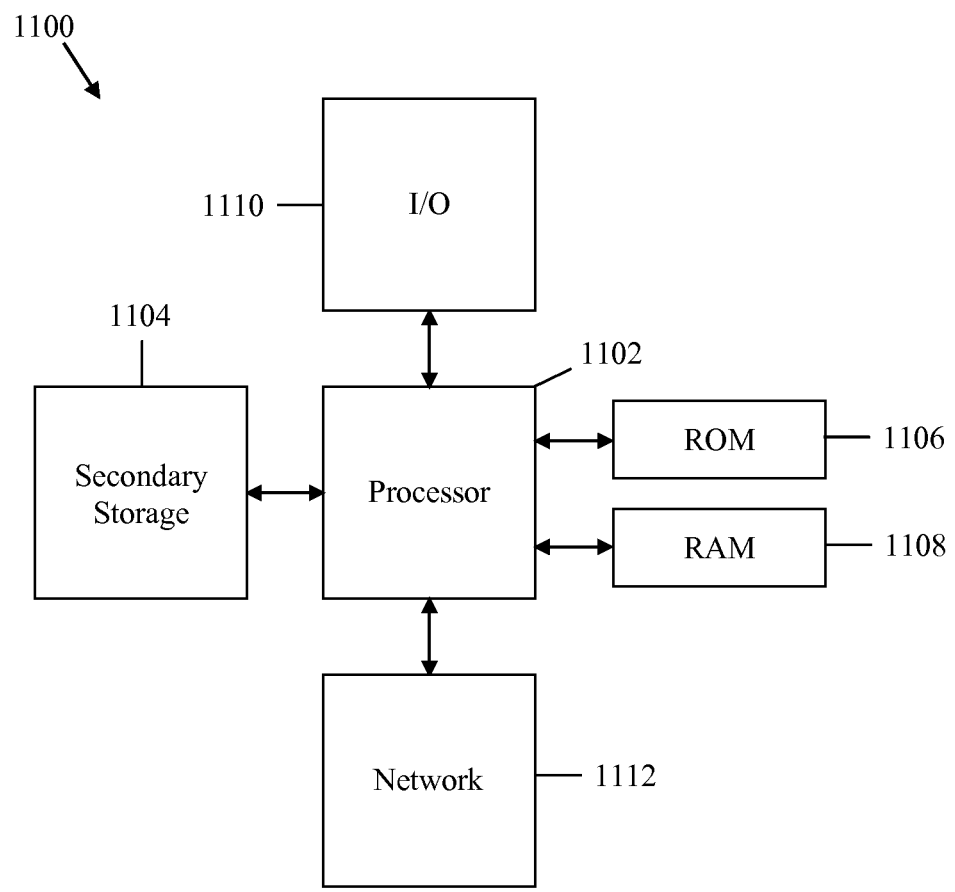
FIG. 11 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 11 illustrates a typical, general-purpose network component or computer system 1100 suitable for implementing one or more embodiments of the methods disclosed herein, such as the PIM QoS reservation method 600. The general-purpose network component or computer system 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, one or more cores (e.g., a multi-core processor), or may be part of one or more application specific integrated circuits (ASICs) and/or digital signal processors (DSPs). The processor 1102 may be configured to implement any of the schemes described herein, including the PIM QoS reservation method 600, which may be implemented using hardware, software, or both. For example, the processor 1102 may include or be coupled to a computer-readable medium, which may be programmed to control the functions of any, NE, node, component, or device in networks 100-500.

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a receiver configured to:
      receive a first protocol multicast independent (PIM) message comprising a first quality of service (QoS) data from a first network element (NE) via a first network connection, wherein the first NE is directly connected to the apparatus; and
      receive a second PIM message comprising a second QoS data from a second NE via a second network connection, wherein the second NE is directly connected to the apparatus;
   a processor coupled to the receiver and configured to determine a multicast QoS requirement for both the first directly connected NE and the second directly connected NE by selecting a most stringent QoS requirement between the first directly connected NE and the second directly connected NE based on the first QoS data and the second QoS data; and
   a transmitter coupled to the processor and configured to transmit a third PIM message comprising the most stringent QoS requirement between the first directly connected NE and the second directly connected NE to a third NE,
   wherein the third PIM message comprises:
      a PIM join message;
      a QoS Option Value Field that comprises at least one value taken from a group of Minimum Bandwidth, Maximum Bandwidth, Maximum Packet Size, Maximum Latency, and Queue Type;
      a QoS Option Type Field that indicates a type of value contained in the QoS Option Value Field;
      a QoS Option Length Field that indicates a length of the QoS option Value Field;
      an Attribute Type Field that indicates that the third PIM message comprises a QoS option;
      a Unicast Address of Network Management Server Field that indicates a unicast address of an entity to be notified in case of QoS failure;
      an N flag that indicates whether a QoS reservation has failed or whether an upstream router does not support PIM QoS; and
      a F flag that indicates whether to forward the third PIM message in case of a QoS reservation failure.

2. The apparatus of claim 1, wherein the first QoS data comprises at least one data type taken from a group of: bandwidth availability, maximum latency, queue depth, priority, and platform dependent parameters.

3. The apparatus of claim 1, wherein the third NE is upstream from the apparatus in a multicast tree.

4. The apparatus of claim 3, wherein the first NE and the second NE are downstream from the apparatus in the multicast tree.

5. The apparatus of claim 1, wherein the first PIM message and the second PIM message each comprise a join message as set forth in Internet Engineering Task Force (IETF) documents Request for Comment (RFC) 5384.

6. A method implemented in a first network element (NE) comprising:
   receiving, via a receiver, a first protocol independent multicast (PIM) join message comprising a first quality of service (QoS) data from a second NE, wherein the second NE is directly connected to the first NE in a downstream direction of a multicast channel;
   receiving, via the receiver, a second PIM join message comprising a second QoS data from a third NE, wherein the third NE is directly connected to the first NE in a downstream direction of the multicast channel;
   determining a multicast QoS requirement for both the second directly connected NE and the third directly connected NE by selecting a most stringent QoS requirement between the second directly connected NE and the third directly connected NE based on the first QoS data and the second QoS data;
   transmitting, via a transmitter, a third PIM join message comprising the most stringent QoS requirement between the second directly connected NE and the third directly connected NE to a fourth NE, wherein the fourth NE is upstream from the first NE in the multicast channel;
   attempting to make a QoS reservation based on the selected most stringent requirement; and
   sending a PIM QoS fail message to the second NE or a network management server when the QoS reservation is unsuccessful,
   wherein the PIM QoS fail message comprises:
      a PIM Version Field that indicates a version of PIM that is being used by other components;
      a type Field that indicates the PIM QoS fail message is a QoS Failure Message;
      an Error Code Field that indicates a reason for a related QoS failure;
      a U bit that indicates whether the QoS failure is an uplink failure or a downlink failure;
      an F bit that indicates whether the QoS failure is currently occurring;
      a Failed Group Address Field and a Failed Source Address Field that indicate a channel of the QoS failure; and
      a QoS Failed PIM Link Address Field that indicates a network address of the QoS failure, and
   wherein the reason for the QoS failure comprises at least one reason selected from a group of minimum bandwidth reservation failed, maximum bandwidth reservation failed, maximum packet size cannot be satisfied, latency cannot be satisfied, and queue programming failed.

7. The method of claim 6, further comprising making a QoS reservation based on the selected most stringent QoS requirement.

8. The method of claim 7, wherein the first NE comprises an egress buffer, and wherein the QoS reservation comprises an allocation of the egress buffer.

9. The method of claim 6, further comprising:
   attempting to make a QoS reservation based on the selected most stringent requirement; and
   discarding the first PIM join message when the QoS reservation is unsuccessful.

10. The method of claim 6, further comprising:
    sending a first PIM hello message to a fifth NE;
    receiving a second PIM hello message from the fifth NE; and
    determining whether the fifth NE is PIM QoS capable based on the second PIM hello message received from the fifth NE.

11. The method of claim 6, further comprising performing traffic shaping based on the first QoS data, the second QoS data, or combinations thereof.

12. The method of claim 6, wherein the first PIM join message is used in a PIM source specific multicast (PIM- SSM) network, a PIM dense mode (PIM-DM) network, a PIM sparse mode (PIM-SM) network, or a PIM bidirectional (PIM-BIDIR) network.

13. A method implemented in a first network element (NE) comprising:
sending a first protocol independent multicast (PIM) message comprising quality of service (QoS) data to a second NE,
wherein the second NE is upstream from the first NE, and wherein the first PIM message comprises:
  a PIM join message;
  a QoS Option Value Field that comprises at least one value taken from a group of Minimum Bandwidth, Maximum Bandwidth, Maximum Packet Size, Maximum Latency, and Queue Type;
  a QoS Option Type Field that indicates a type of value contained in the QoS Option Value Field;
  a QoS Option Length Field that indicates a length of the QoS Option Value Field;
  an Attribute Type field that indicates that the first PIM message comprises a QoS option;
  a Unicast Address of Network Management Server Field that indicates a unicast address of an entity to be notified in case of QoS failure;
  an N flag that indicates whether a QoS reservation has failed or whether an upstream router does not support PIM QoS; and
  a F flag that indicates whether to forward the first PIM message in case of a QoS reservation failure.

14. The method of claim 13, further comprising:
sending a second PIM message to a third NE, wherein the second PIM message comprises a first hello message that comprises a first option that indicates that the first NE supports PIM QoS; and
receiving a third PIM message from the third NE, wherein the third PIM message comprises a second hello message that comprises a second option that indicates that the third NE supports PIM QoS.

15. The method of claim 14, wherein the first option of the first hello message comprises an Option Type field that indicates the first hello message is a PIM QoS hello message, and wherein the first hello message comprises an Option Length Field that indicates the first option has a length of zero excluding the Option Type Field and the Option Length Field.

16. The method of claim 13, further comprising receiving a third PIM message,
wherein the third PIM message comprises a QoS Failure Message,
wherein the QoS Failure Message comprises:
  a PIM Version field that indicates a version of PIM that is being used by other components;
  a type field that indicates the third PIM message is the QoS Failure Message;
  an Error Code Field that indicates a reason for a related QoS failure;
  a U bit that indicates whether the QoS failure is an uplink failure or a downlink failure;
  an F bit that indicates whether the QoS failure is currently occurring;
  a Failed Group Address Field and a Failed Source Address Field that indicate a channel of the QoS failure; and
  a QoS Failed PIM Link Address Field that indicates a network address of the QoS failure, and
wherein the reason for the QoS failure comprises at least one reason selected from a group of minimum bandwidth reservation failed, maximum bandwidth reservation failed, maximum packet size cannot be satisfied, latency cannot be satisfied, and queue programming failed.

* * * * *